(12) United States Patent
Qin et al.

(10) Patent No.: US 9,714,885 B2
(45) Date of Patent: Jul. 25, 2017

(54) FAULT PREDICTION AND CONDITION-BASED REPAIR METHOD OF URBAN RAIL TRAIN BOGIE

(71) Applicant: BEIJING JIAOTONG UNIVERSITY, Beijing (CN)

(72) Inventors: Yong Qin, Beijing (CN); Limin Jia, Beijing (CN); Jingxuan Shi, Beijing (CN); Xiaoqing Cheng, Beijing (CN); Yuan Zhang, Beijing (CN); Shan Yu, Beijing (CN); Linlin Kou, Beijing (CN); Zhenyu Zhang, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 28 days.

(21) Appl. No.: 14/890,167

(22) PCT Filed: Dec. 5, 2014

(86) PCT No.: PCT/CN2014/093080
§ 371 (c)(1),
(2) Date: Nov. 10, 2015

(87) PCT Pub. No.: WO2016/029590
PCT Pub. Date: Mar. 3, 2016

(65) Prior Publication Data
US 2016/0282229 A1 Sep. 29, 2016

(30) Foreign Application Priority Data

Aug. 28, 2014 (CN) .......................... 2014 1 0431294

(51) Int. Cl.
*G01M 17/08* (2006.01)
*G01M 17/10* (2006.01)
*G06N 3/02* (2006.01)

(52) U.S. Cl.
CPC ............ *G01M 17/10* (2013.01); *G01M 17/08* (2013.01); *G06N 3/02* (2013.01)

(58) Field of Classification Search
CPC ......... G01M 17/10; G01M 17/08; G06N 3/02
See application file for complete search history.

(56) References Cited

U.S. PATENT DOCUMENTS 5,919,267 A * 7/1999 Urnes .................. G06F 11/0736
714/26

FOREIGN PATENT DOCUMENTS

CN 103810328 A * 5/2014

OTHER PUBLICATIONS

Lin et al., Reliability analysis for degradation of locomotive wheels using parameteric bayesian approach, 2013, Wiley online library, pp. 1-10.*

(Continued)

*Primary Examiner* — John Breene
*Assistant Examiner* — Eyob Hagos
(74) *Attorney, Agent, or Firm* — Gokalp Bayramoglu

(57) ABSTRACT

The present invention provides a fault prediction and condition-based repair method of an urban rail train bogie. An optimum service life distribution model of a framework, a spring device, a connecting device, a wheel set and axle box, a driving mechanism, and a basic brake device of a bogie is determined by adopting a method based on survival analysis; a reliability characteristic function of each subsystem is obtained; then, a failure rate of each subsystem of the bogie is calculated by adopting a neural network model optimized by an evolutionary algorithm; and finally, proportional risk modelling is conducted by taking the failure rate and safe operation days of each subsystem of the bogie as concomi- (Continued)

tant variables; and on the basis of cost optimization, thresholds and control limits for condition-based repair of a bogie system are obtained.

2 Claims, 6 Drawing Sheets

(56) References Cited

OTHER PUBLICATIONS

Marshall, An introduction to reliabiltiy and life distribution, 2011, The university of warwick, pp. 1-75.*
Zhang et al., A hybrid particle swarm optimization back propagation algorithm for feedforward neural network training, 2007, ScienceDirect, pp. 1026-1036.*
Naiwen Guo et al, The Study of the Maintenance Cycle Model of the Key Parts in Wagon Bogie, Equipment Manufactring Technology, Jun. 15, 2009, No. 6, pp. 116-117.
Huayuan Fang et al, An effective method for improving precision of reliability data analysis, Electronics Optics&Control, Jan. 31, 2006, vol. 13, No. 1, pp. 78-80.
Lei Chen et al, Reliability Analysis Method for the Lateral Dynamics Performance of the Speed-Increased Wagon, China Railway Science, May 31, 2009, vol. 30, No. 3, pp. 97-101.
Yuanxiang Wang et al, EMUs Fault statistics and part life analysis, Railway Computor Application, Jan. 31, 2013, vol. 22, No. 1, pp. 29-32.

* cited by examiner

FAULT PREDICTION AND CONDITION-BASED REPAIR METHOD OF URBAN RAIL TRAIN BOGIE

TECHNICAL FIELD

The present invention relates to a fault prediction and condition-based repair method of a bogie, and more particularly to a fault prediction and condition-based repair method of an urban rail train bogie.

BACKGROUND

An urban rail train bogie system is an important part of an urban rail train, which is used for transferring various loads, and utilizing an adhesion force between wheel rails to guarantee the generation of a traction force. To a great extent, the performance of the bogie system decides running stability and safety of the train. Therefore, it means a lot to the running stability and safety of the urban rail train how to accurately evaluate a reliability of the urban rail train bogie system and to predict a failure rate of the bogie system. Meanwhile, during the normal usage, the bogie system requests timely inspection, repair, and maintenance. What's more, the cost spent on inspection, repair, and maintenance of the bogie system takes a main part in the overall maintenance cost of the urban rail train. Therefore, the process of accurately evaluating a running status of the urban rail train bogie system and working out a reasonable repair plan of the bogie system has a great meaning in guaranteeing the urban rail train to run safely and economically.

The method for researching system reliability mainly includes a statistical model method and a mechanism model method. The statistical model method mainly analyzes a probability distribution function of the system failure time, and obtains reliability indexes associated with the system, for example, a mean time between failures, failure rate, etc. The mechanism model method mainly performs reliability analysis on a structural mechanism of the system. Considering the research about maintenance decision-making modeling, the prior art comprehensively considers the effects on the service life of the system caused by factors of running conditions, load, and so on, conducts the maintenance modeling for rotating machinery, and obtains better effects, which implies that the concomitant variable plays an important role in researching the service life distribution regularity of the system.

The above researches have made certain achievements in terms of both reliability analysis and condition-based repair of the bogie system. However, there are still some problems. (1) Currently, the above researches are mainly directed to railway passenger cars and railway freight cars, whereas the researches about the reliability of the urban rail train bogie are seldom performed. (2) The above methods are based on monitoring or inspection data, which sometimes cannot accurately master a service life of the bogie. Thus, it lacks of consideration about the time uncertainty. (3) In terms of the traditional mathematical description of system service life or system performance degradation, it is generally evaluated based on one-dimensional time variable. However, for a complicated system such as a bogie, due to the factors such as ambiguity of repair thresholds and randomness of failure mode, only one-dimensional time variable is not sufficient for making evaluations objectively. Instead, the effects on the system running caused by relevant concomitant variables such as performance parameter, failure type, and so on must be considered at the same time, and thus offering more powerful reference for making repair optimization decisions.

SUMMARY OF THE INVENTION

The present invention performs reliability analysis on each critical part of a bogie system, creates a failure rate prediction model by means of collecting and analyzing history inspection data of the critical parts of the bogie system, and creates a proportional risk model directed to the whole bogie system.

Specifically, the present invention adopts the following technical solutions.

The present invention provides a condition-based repair method of an urban rail train bogie, in which the bogie includes six subsystems, that is, a framework, a spring device, a connecting device, a wheel set and axle box, a driving mechanism, and a basic brake device. The method sequentially includes steps as follows: (1) performing a censored processing based on a collected history failure data, determining an optimum service life distribution model of each subsystem of the bogie based on a survival analysis method, obtaining a reliability characteristic function of each subsystem, calculating a reliability of each subsystem, and determining a subsystem with a lowest reliability as a most fragile part in the bogie, and focusing the most fragile part; (2) calculating a failure rate of each subsystem of the bogie by adopting a neural network model optimized by an evolutionary algorithm; (3) conducting a proportional risk modeling by taking safe operation days and the calculated failure rate of each subsystem of the bogie as concomitant variables, and obtaining thresholds and control limits for condition-based repair of a bogie system, in which an upper control limit is a failure threshold, and during a running process, once a system status value is found to exceed the upper control limit, the system is in an unusable status at this time, and based on regulations, a corrective maintenance or replacement shall be performed before the system is reused, a lower control limit is a preventive maintenance or replacement threshold, and indicates that a potential failure of the system starts to appear, and once the system status value exceeds the lower control limit, a corresponding troubleshooting or preventive maintenance shall be performed on a corresponding part, and if the system status value is lower than the lower control limit, the system does not need to be repaired.

Preferably, Step (1) further includes the following steps:

1) creating a two-parameter Weibull distribution model of the wheel set and axle box, the spring device, and the connecting device, The Failure Distribution Function is $$F(t) = 1 - \exp\left\{-\left[\frac{t}{\eta}\right]^{\beta}\right\}$$

The Reliability Function is:

$$R(t) = \exp\left\{-\left(\frac{t}{\eta}\right)^{\beta}\right\}$$

The Probability Density Function is:

$$f(t) = \frac{\beta}{\eta}\left(\frac{t}{\eta}\right)^{\beta-1}\exp\left[-\left(\frac{t}{\eta}\right)^{\beta}\right]$$

The Failure Rate Function is:

$$\lambda(t) = \frac{\beta}{\eta}\left(\frac{t}{\eta}\right)^{\beta-1}$$

In the above equations, t≥0, β>0 and η>0, t is a time between failures, β and η are respectively a shape parameter and a scale parameter of the distribution.

2) creating a three-parameter Weibull distribution model of the framework, the driving mechanism, and the basic brake device, The Failure Distribution Function is:

$$F(t) = 1 - \exp\left\{-\left[\frac{t-\gamma}{\eta}\right]^{\beta}\right\}$$

The Reliability Function is:

$$R(t) = \exp\left\{-\left(\frac{t-\gamma}{\eta}\right)^{\beta}\right\}$$

The Probability Density Function is:

$$f(t) = \frac{\beta}{\eta}\left(\frac{t-\gamma}{\eta}\right)^{\beta-1}\exp\left[-\left(\frac{t-\gamma}{\eta}\right)^{\beta}\right]$$

The Failure Rate Function is:

$$\lambda(t) = \frac{\beta}{\eta}\left(\frac{t-\gamma}{\eta}\right)^{\beta-1}$$

In the above equations, t is a time between failures, β>0 and η>0, β and η are respectively a shape parameter and a scale parameter of the distribution, and γ is a location parameter of the distribution.

Preferably, Step (2) further includes the following steps: creating a back propagation (BP) neural network model based on Particle Swarm Optimization (PSO), that is, optimizing a BP neural network connecting weight by adopting PSO, and training the BP neural network, and during modeling, determining some PSO parameters, which are set as follows:

1) Particle Number

Generally, the particle number is selected as 20~40. For most problems, 30 particles are sufficient for obtaining ideal results. Herein, the particle number is selected as 30.

2) Maximum Particle Velocity

The maximum velocity of the particles decides a maximum distance that a particle can move in one flight. The maximum velocity of the particles must be restricted, and otherwise, the particles may escape out of a searching space. The maximum velocity of the particle is generally set as a width of a particle scope, which is selected as 0.5 herein.

3) Acceleration Constant

Learning factors $c_1$ and $c_2$ represent the degrees that the particles are affected by social knowledge and individual cognition, and generally, they are set as the same value, so that the same weight is given, $c_1=c_2=2$; once two optimum locations are found, the particles update their velocities and locations based on the following equations, $$v_i^{k+1} = w*v_i^k + c_1 r_1(p_i^k - x_i^k) + c_2 r_2(p_g^k - x_i^k)$$

$$x_i^{k+1} = x_i^k + v_i^{k+1}$$

In the above equations, $v_i^{k+1}$ indicates a flying velocity of the $i^{th}$ particle at the $(k+1)^{th}$ generation; $x_i^{k+1}$ indicates a location of the $i^{th}$ particle at the $(k+1)^{th}$ generation; $p_i^k$ indicates an optimum location of the $i^{th}$ particle to the $k^{th}$ generation; $p_g^k$ indicates an optimum location of a swarm to the $k^{th}$ generation; $p_i^k - x_i^k$ indicates an individual cognition; $p_g^k - x_i^k$ indicates a swarm cognition; w indicates an inertia weight; $v_i^k$ indicates a velocity of a particle; $c_1$ and $c_2$ indicate learning factors; $r_1$ and $r_2$ are random numbers evenly distributed in [0,1]; i=1, 2 ... N;

4) Fitness Function

The fitness function is a standard for distinguishing good and bad individuals in a swarm, and is also a unique reference for making selection, the larger the better. Based on network evaluating indexes determined in the specifications, a reciprocal of a root mean square error (RMSE) between a network output and a desired output is taken as an evaluating standard, and its fitness function is, $$f=1/\text{RMSE};$$

5) initializing; normalizing input and output data to [−1, 1], in which particle swarms generated after initializing represent a neural network combined by different, weights and thresholds, and generate an initial BP network structure;

6) evaluating; calculating a fitness value based on the equation in Step 4);

7) updating a location and a velocity; continuously updating locations of particles by means of comparing the fitness values, taking an individual extremum with the best fitness value as a global extremum, taking the corresponding weight and threshold as a current optimum solution of the particle swarm, and updating the velocity;

8) determining termination of the algorithm; terminating iteration when it reaches maximum iteration times or the fitness value reaches an expected error;

9) survival of the optimum solution; when the iteration is terminated, a weight and a threshold corresponding to a global weight is an optimum solution for the training sample; and 10) performing learning by substituting the optimum solution into the BP neural network model, for anticipating a failure rate.

Preferably, Step (3) further includes the following steps:

1) creating a proportional risk model of the bogie, in which a risk function is:

$$h(t\mid X(t)) = \frac{\beta}{\eta}\left(\frac{t}{\eta}\right)^{\beta-1}\exp(\gamma\cdot X(t))$$

obtaining a failure rate threshold h*:

$$h^* \geq \frac{\beta}{\eta}\left(\frac{t}{\eta}\right)^{\beta-1}\exp(\gamma\cdot X(t))$$

in which, t is a time between failures, β>0 and η>0, β and η are respectively a shape parameter and a scale parameter of the distribution, γ is a location parameter of the distribution, and X(t) is a concomitant variable;

2) making a draft by taking a working time t as an x-coordinate, and taking it value of $$\ln\left(\frac{\eta^\beta h^*}{\beta}\right) - (\beta - 1)\ln t$$

as a y-coordinate, in which an upper line in the drawing indicates an upper control limit corresponding to the failure rate threshold, and a lower line indicates a lower control limit corresponding to the failure rate threshold.

The present invention has the following beneficial efficacies:

(1) mastering failure information, current reliability status, and a changing trend of the reliability of critical parts in the bogie system accurately and timely, and mastering fragile parts in the bogie system accurately;

(2) predicating failure rates of the critical parts in the bogie system scientifically and accurately;

(3) based on a running status of the bogie system and its various parts, making proper repair decisions, and optimizing the repair decisions by fully considering the factors that affect the repair cost, to avoid wastes of the repair cost, and making preventive maintenance on the bogie system based on the predicted failure rate.

DETAILED DESCRIPTIONS

I. Calculating a Reliability of Each Subsystem in a Bogie

Figure 1:
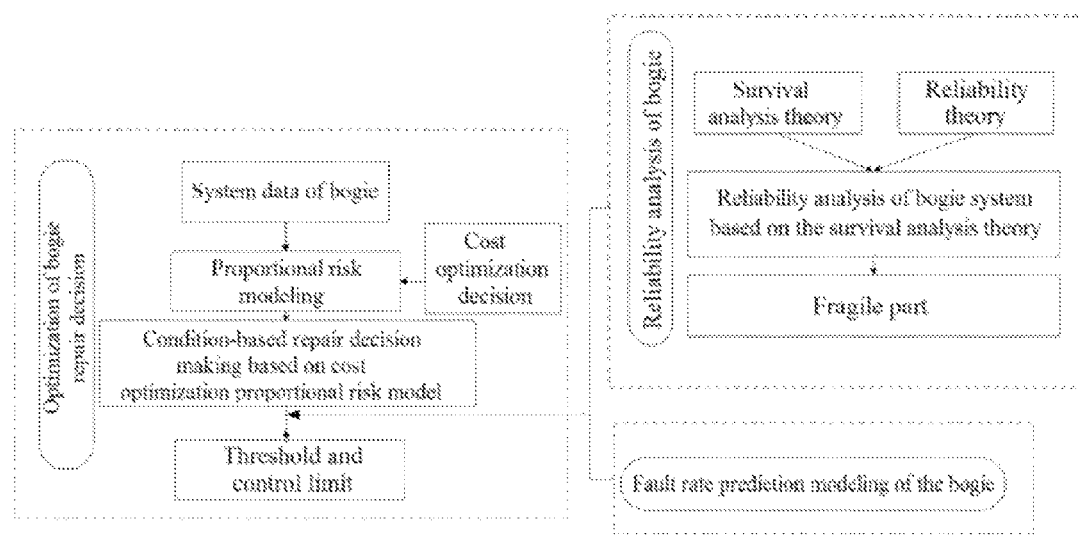
FIG. 1 is a main flow chart of the present invention.

Referring to FIG. 1, firstly, the method includes accurately mastering a reliability trend of each critical part in a bogie system accurately, making a censored processing based on a collected history failure data, performing a reliability analysis on the bogie system based on a survival analysis theory, obtaining a best distribution model based on the failure data of each critical part, mastering a reliability trend of each critical part timely, and obtaining a fragile part of the bogie system by means of making a contrastive analysis; then, performing a predication model research on the failure rate of each critical part in the bogie system, collecting a history inspection data of each critical part, performing collection and analysis, and using failure rates of parts with lower reliabilities to create a failure rate prediction model by adopting a BP neural network optimized by PSO (PSO-BP); and finally, making condition-based repair decision of the bogie system based on inspection data. Status parameters of each part in the bogie are taken as concomitant variables. Some concomitant variables that significantly affect the running safety of the bogie are filtered, and considering the cost factors, the thresholds and control limits for the condition-based repair of the bogie are optimized, and furthermore, the validity of the model is authenticated with reference to the predicted failure rates.

Making statistics of censored data: when making statistics about failure data of the bogie system, it mainly involves two types of censored data. One type is interval censored data. It is assumed that the inspection work is reliable, a failure occurs between this inspection and last inspection, and an exact time for the failure is unknown. For example, the time for NO. 2 is (35, 36] and it means that no failure occurs in the inspection performed on the $35^{th}$ day, but a failure occurs in the inspection performed on the $36^{th}$ day, which indicates that the failure occurs between the $35^{th}$ day and the $36^{th}$ day, and the failure time is an interval value, an uncertain value, and the exact failure time is unknown. The other type is right censored data. At the beginning and the end of a time period for making statistics, there are both truncation data, and the failure time is larger than a certain value that is tracked, and the exact failure time is unknown. For example, the time for NO. 59 is (43, ], and it means that when the time period for making statistics is ended, the wheel set and axle box system does not have any failure, and the failure time is larger than 43 days and the exact failure time is unknown. The censored data of the failure time for the wheel set and axle box system is as shown in Table 3-2.

TABLE 3-2

Censored Data of Failure Time

| NO. | Time |
|---|---|
| 1 | (34,] |
| 2 | (35, 36] |
| 3 | (42, 43] |
| ... | ... |
| 59 | (43,] |

Determining a distribution model for each subsystem: firstly, inputting failure data of the wheel set and axle box into a Minitab worksheet, selecting a reliability/survival statistics tool, adopting a method of maximum likelihood estimation (MLE) to respectively perform parameter estimation and goodness of fit authentication on exponential distribution, logarithmic normal distribution, two-parameter Weibull distribution, and three-parameter Weibull distribution, and obtaining parameter values as shown in the following Table 3-3 by means of calculation.

TABLE 3-3

Service Life Distribution Models of Wheel Set and Axle Box System

| Distribution Model | A-D Statistics | Selected Distribution |
|---|---|---|
| Exponential Distribution | 8.075 | Three-Parameter Weibull |
| Logarithmic Normal Distribution | 0.631 | |
| Two-Parameter Weibull | 1.535 | |
| Three-Parameter Weibull | 0.464 | |

A part of failure data points falls out of confidence intervals of the two-parameter Weibull distribution, the logarithmic normal distribution, and the exponential distribution, and the one who has the poorest fitness is the exponential distribution, and the three-parameter Weibull distribution has better fitness effects. With reference to the A-D Statistics shown in Table 3-3, it can be known that, the three-parameter Weibull has a lowest A-D Statistics level, that is, 0.464, which has the best fitness effects. Thus, the optimum distribution for the wheel set and axle box system is the three-parameter Weibull distribution.

Similarly, the failure distribution models for the framework, the spring device, the connecting device, the driving mechanism, and the basic brake device can be determined.

A reliability characteristics value is an index for evaluating equipment reliability, which mainly includes: a Cumulative Distribution Function (CDF), a Reliability Function, a Probability Density Function, a Failure Rate Function, a Mean Time Between Failures (MTBF), and so on.

Table 3-5 has listed MTBF for each critical subsystem of the bogie. As shown in Table 3-5, the basic brake device has the highest MTBF, about 71 days, whereas the spring device and the wheel set and axle box both have lower MTBF, that is, 36.38 days and 37.02 days respectively.

TABLE 3-5

MTBF for Each Critical Subsystem

| System | Framework System | Spring Device System | Connecting Device System | Wheel Set and Axle Box | Driving Mechanism | Basic Brake Device |
|---|---|---|---|---|---|---|
| MTBF (Day) | 47.2385 | 36.3806 | 55.2275 | 37.0188 | 41.2417 | 71.3030 |

(I) Reliability Characteristics Value for Wheel Set and Axle Box System

The wheel set and axle box conforms to the two-parameter Weibull distribution model, in which its shape parameter $\beta$ is 1.30274, the scale parameter $\eta$ is 6.65490, the threshold $\gamma$ is 30.8751. Thus, the Failure Time Probability Density Function $f(t)$, the Cumulative Distribution Function $F(t)$, the Reliability Function $R(t)$, and the Failure Rate Function $\lambda(t)$ are shown as follows:

The Failure Time Probability Density Function is:

$$f(t) = \frac{1.30274}{6.65490^{1.30274}}(t-30.8751)^{0.30274} e^{-(\frac{t-30.8751}{6.65490})^{1.30274}}$$

The Cumulative Distribution Function is:

$$F(t) = 1 - e^{-(\frac{t-30.8751}{6.65490})^{1.30274}}$$

The Reliability Function is:

$$R(t) = e^{-(\frac{t-30.8751}{6.65490})^{1.30274}}$$

The Failure Rate Function is:

$$\lambda(t) = \frac{1.30274}{6.65490}\left(\frac{t-30.8751}{6.65490}\right)^{0.30274}$$

In the above equations, t indicates a current time between failures.

(II) Reliability Characteristics Value for Framework System

The framework system conforms to the three-parameter Weibull distribution model, in which its shape parameter $\beta$ is 1.11033, the scale parameter $\eta$ is 17.3204, and the threshold $\gamma$ is 30.5765. Thus, the Failure Time Probability Density Function $f(t)$, the Cumulative Distribution Function $F(t)$, the Reliability Function $R(t)$, and the Failure Rate Function $\lambda(t)$ are shown as follows.

The Failure Time Probability Density Function is:

$$f(t) = \frac{1.11033}{17.3204^{1.11033}}(t-30.5765)^{0.11033} e^{-(\frac{t-0.5765}{17.3204})^{1.11033}}$$

The Cumulative Distribution Function is:

$$F(t) = 1 - e^{-(\frac{t-30.5765}{17.3204})^{1.11033}}$$

The Reliability Function is:

$$R(t) = e^{-(\frac{t-30.5765}{17.3204})^{1.11033}}$$

The Failure Rate Function is:

$$\lambda(t) = \frac{1.11033}{17.3204}\left(\frac{t-30.5765}{17.3204}\right)^{0.11033}$$

(III) Reliability Characteristics Value for Spring Device System

The spring device system conforms to the two-parameter Weibull distribution model, in which its shape parameter $\beta$ is 7.83533, and the scale parameter $\eta$ is 38.6704. Thus, the Failure Time Probability Density Function $f(t)$, the Cumulative Distribution Function $F(t)$, the Reliability Function $R(t)$, and the Failure Rate Function $\lambda(t)$ are shown as follows.

The Failure Time Probability Density Function is:

$$f(t) = \frac{7.83533}{38.6704^{7.83533}} t^{6.83533} e^{-(\frac{t}{38.6704})^{7.83533}}$$

The Cumulative Distribution Function is:

$$F(t) = 1 - e^{-(\frac{t}{38.6704})^{7.83533}}$$

The Reliability Function is:

$$R(t) = e^{-(\frac{t}{38.6704})^{7.83533}}$$

The Failure Rate Function is:

$$\lambda(t) = \frac{7.83533}{38.6704}\left(\frac{t}{38.6704}\right)^{6.83533}$$

(IV) Reliability Characteristics Value for Connecting Device System

The connecting device system conforms to the two-parameter Weibull distribution model, in which its shape parameter $\beta$ is 3.20939, and the scale parameter $\eta$ is 61.6529. Thus, the Failure Time Probability Density Function ƒ(t), the Cumulative Distribution Function F(t), the Reliability Function R(t), and the Failure Rate Function λ(t) are shown as follows.

The Failure Time Probability Density Function is:

$$f(t) = \frac{3.20939}{61.6529^{3.20939}} t^{2.20939} e^{-\left(\frac{t}{61.6529}\right)^{3.20939}}$$

The Cumulative Distribution Function is:

$$F(t) = 1 - e^{-\left(\frac{t}{61.6529}\right)^{3.20939}}$$

The Reliability Function is:

$$R(t) = e^{-\left(\frac{t}{61.6529}\right)^{3.20939}}$$

The Failure Rate Function is:

$$\lambda(t) = \frac{3.20939}{61.6529}\left(\frac{t}{61.6529}\right)^{2.20939}$$

(V) Reliability Characteristics Value for Driving Mechanism

The driving mechanism conforms to the three-parameter Weibull distribution model, in which its shape parameter β is 1.37215, the scale parameter η is 11.6081, the threshold γ is 30.6272. Thus, the Failure Time Probability Density Function ƒ(t), the Cumulative Distribution Function F(t), the Reliability Function R(t), and the Failure Rate Function λ(t) are shown as follows.

The Failure Time Probability Density Function is:

$$f(t) = \frac{1.37215}{11.6081^{1.37215}}(t - 30.6272)^{0.37215} e^{-\left(\frac{t-30.6272}{11.6081}\right)^{1.37215}}$$

The Cumulative Distribution Function is:

$$F(t) = 1 - e^{-\left(\frac{t-30.6272}{11.6081}\right)^{1.37215}}$$

The Reliability Function is:

$$R(t) = e^{-\left(\frac{t-0.6272}{11.6081}\right)^{1.37215}}$$

The Failure Rate Function is:

$$\lambda(t) = \frac{1.37215}{11.6081}\left(\frac{t - 30.6272}{11.6081}\right)^{0.37215}$$

(VI) Reliability Characteristics Value for Basic Brake Device

The basic brake device conforms to the three-parameter Weibull distribution model, in which its shape parameter β is 1.11546, the scale parameter η is 36.7574, the threshold γ is 35.9950. Thus, the Failure Time Probability Density Function ƒ(t), the Cumulative Distribution Function F(t), the Reliability Function R(t), and the Failure Rate Function λ(t) are shown as follows.

The Failure Time Probability Density Function is:

$$f(t) = \frac{1.11546}{36.7574^{1.11546}}(t - 35.9950)^{0.11546} e^{-\left(\frac{t-35.9950}{36.7574}\right)^{1.11546}}$$

The Cumulative Distribution Function is:

$$F(t) = 1 - e^{-\left(\frac{t-35.9950}{36.7574}\right)^{1.11546}}$$

The Reliability Function is:

$$R(t) = e^{-\left(\frac{t-35.9950}{36.7574}\right)^{1.11546}}$$

The Failure Rate Function is:

$$\lambda(t) = \frac{1.11546}{36.7574}\left(\frac{t - 35.9950}{36.7574}\right)^{0.11546}$$

Figure 2:
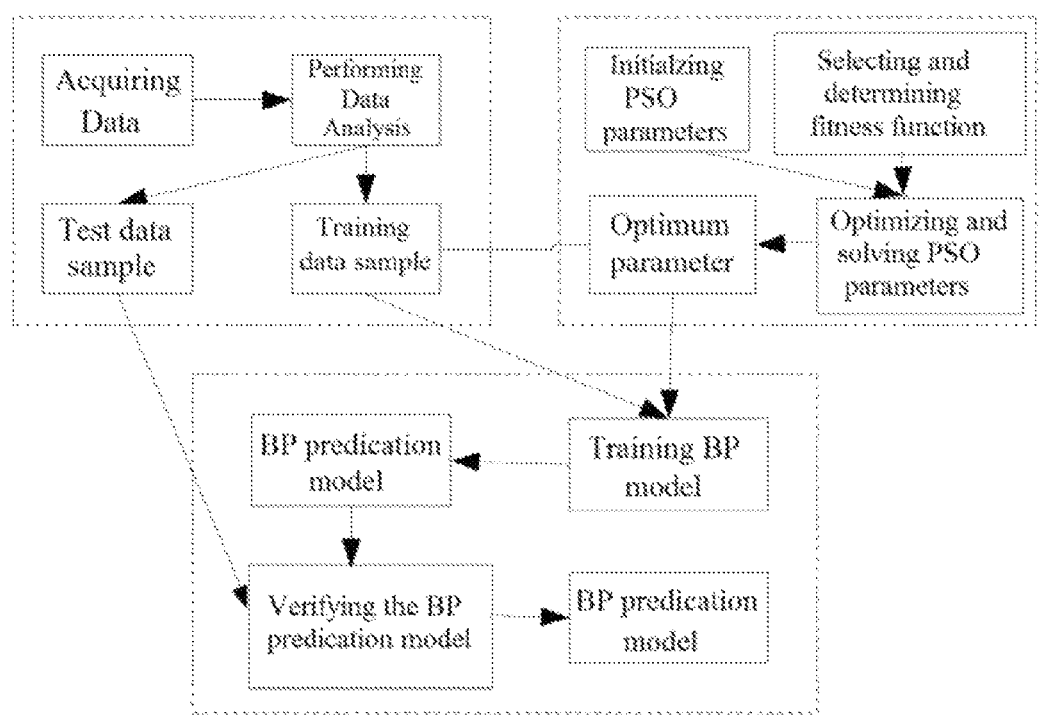
FIG. 2 is a flow chart of PSO-BP predication modeling.

II. Calculating a Failure Rate of Each Subsystem of the bogie by Adopting a Neural Network Model Optimized by an Evolutionary Algorithm;

The PSO-BP predication modeling is conducted by the following four steps, and the flow chart of the PSO-BP predication modeling is as shown in FIG. 2.

(1) Acquiring experimental data samples, filtering the data samples, and determining training data samples and test data samples;

(2) Utilizing the PSO algorithm to optimize and determine BP relevant parameters, determining PSO fitness function, and particle swarm scale, iterative algebra, and so on.

(3) Taking optimum parameters obtained after PSO training and the training data samples as inputs to perform BP model training.

(4) Inputting the test data into a prediction model obtained after training, verifying a prediction precision of the model, and finally obtaining a PSO-BP prediction model.

The failure rate prediction of each critical subsystem refers to using a history failure rate of each system to predict a future failure rate. Based on characteristics of failure data for metro vehicles, it makes statistics about failure times of each critical subsystem by taking "Week" as a time unit, and makes statistics about 130 pieces of failure data, and finally calculates a failure rate of each critical system by using the following equation.

$$\lambda_i = \frac{\sum_{i=1}^{n} r_i}{\sum_{i=1}^{n} t_i} = N_0/T$$

n—Number of vehicles being sampled $t_i$—Actual working time of the $i^{th}$ vehicle within the inspection period, the unit is Hour $r_i$—Failure times of the $i^{th}$ vehicle within the inspection period $N_0$—Accumulated failure times of the system within the inspection period T—Total working time within the inspection period.

Creating a PSO-based BP neural network model, that is, optimizing a BP neural network connecting weight by adopting PSO, and training the BP neural network. During modeling, it needs to determine some PSO parameters, which are set as follows:

(1) Particle Number

Generally, the particle number is selected as 20~40. For most problems, 30 particles are sufficient for obtaining ideal results. Herein, the particle number is selected as 30.

(2) Maximum Particle Velocity

The maximum velocity of the particles decides a maximum distance that a particle can move in one flight. The maximum velocity of the particle must be restricted, and otherwise, the particles may escape out of a searching space. The maximum velocity of the particle is generally set as a width of a particle scope, which is selected as 0.5 herein.

(3) Acceleration Constant

Learning factors $c_1$ and $c_2$ represent the degrees that the particles are affected by social knowledge and individual cognition, and generally, they are set as the same value, so that the same weight is given, $c_1=c_2=2$. Once two optimum locations are found, the particles update their velocities and locations based on the following equations (4.33) and (4.34).

$$v_i^{k+1}=w*v_i^k+c_1r_1(p_i^k-x_i^k)+c_2r_2(p_g^k-x_i^k) \quad (4-31)$$

$$x_i^{k+1}=x_i^k+v_i^{k+1} \quad (4-32)$$

In the above equations, $v_i^{k+1}$ indicates a flying velocity of the $i^{th}$ particle at the $(k+1)^{th}$ generation; $x_i^{k+1}$ indicates a location of the $i^{th}$ particle at the $(k+1)^{th}$ generation; $p_i^k$ indicates an optimum location of the $i^{th}$ particle to the $k^{th}$ generation; $p_g^k$ indicates an optimum location of a swarm to the $k^{th}$ generation; $p_i^k-x_i^k$ indicates an individual cognition; $p_x^k-x_i^k$ indicates a swarm cognition; w indicates an inertia weight; $v_i^k$ indicates a velocity of a particle; $c_1$ and $c_2$ indicate learning factors, $r_1$ and $r_2$ are random numbers evenly distributed in [0,1]; i=1, 2 . . . N.

(4) Fitness Function

The fitness function is a standard for distinguishing good and bad individuals in a swarm, and is also a unique reference for making selection, the larger the better. Based on network evaluating indexes determined in the specifications, a reciprocal of a root mean square error (RMSE) between a network output and a desired output is taken herein as an evaluating standard, and its fitness function is $$f=1/RMSE \quad (4-33)$$

(5) Initializing. Normalizing input and output data to [−1,1], in which particle swarms generated after initializing represent a neural network combined by different weights and thresholds, and generate an initial BP network structure.

(6) Evaluating:, calculating a fitness value based on Equation (4-33).

(7) Updating a location and a velocity; continuously updating locations of particles by means of comparing the fitness values, taking an individual extremum with the best fitness value as a global extremum, taking the corresponding weight and threshold as a current optimum solution for the particle swarm, and updating the velocity according to Equation (4-31) and Equation (4-32).

(8) Determining termination of the algorithm; terminating iteration when it reaches maximum iteration times or the fitness value reaches an expected error.

(9) Survival of the optimum solution; when the iteration is terminated, a weight and a threshold corresponding to a global weight is an optimum solution for a training sample; and

(10) Performing learning by substituting the optimum solution into the BP neural network model, for anticipating a failure rate.

III. Making a Condition-based Repair Decision for the Bogie Based on Cost Optimization Proportional Risk Model;

In a proportional risk model, it is assumed that, the system failure times conform to a Non-homogeneous Poisson Process (NHPP), within a given time t, the system failure times are represented by N(t), and the system failure risk function equation is as shown in the following Equation (5-1):

$$v(t) = \lim_{\Delta t \to \infty} \frac{P\{N(t+\Delta t)-N(t) \geq 1 \mid Z(t)\}}{\Delta t} = \frac{dE(N(t))}{dt} \quad (5-1)$$

In the above equation, Z(t) is an inspection quantity of concomitant variables when the system runs to the time t.

For the NHPP, it satisfies an equation as follows:

$$P\{N(t+\Delta t)-N(t) \geq n \mid Z(t)\} = \frac{[H_t(\Delta t)]^n}{n!}\exp(-H_t(\Delta t)) \quad (5-2)$$

In the above equation, $H_t(\Delta t)$ is mean system failure times within the time $[t,t+\Delta t]$.

The NHPP benchmark risk functions mainly include three types, that is, an exponential distribution, a Gumbel distribution, and a Weibull distribution, as shown in Equations (5-3) to (5-5).

$$v_0=\alpha \quad (5-3)$$

$$v_0=\alpha\exp(\gamma t) \quad (5-4)$$

$$v_0=\alpha\gamma t^{\gamma-1} \quad (5-5)$$

During failure, the benchmark risk function for a PHM model may be any one of the above three types of distributions, and PHM model is:

$$v(t|X(t))=v_0\exp(\gamma^T X(t)) \quad (5-6)$$

The reliability function of the system after the time point t and the failure Probability Density Function of the system after the time point t are as shown in Equations (5-7) and (5-8):

$$R(t|X(t))=P\{N(t+\Delta t)-N(t)=0|X(t)\}=\exp\{-\int_t^{t+\Delta t}v(u|X(u))du\} \quad (5-7)$$

$$f(t|X(t))=-R_t(t)=v_0\exp(\gamma^T X(t))\exp\{-\int_t^{t+\Delta t}v(u|X(u))du\} \quad (5-8)$$

Steps for solving a whole-parameter PHM:

The whole-parameter PHM is under a situation that the benchmark risk function is known before hand (conforming to a certain distribution), and regression coefficients for a shape parameter, a scale parameter, and a concomitant variable of the benchmark function are estimated, so that the estimation of such parameters can reach a higher precision.

In terms of the project practice, the Weibull distribution function has been widely applied to the whole-parameter PHM benchmark risk function, which is briefly called Weibull PHM. The Weibull distribution is found by a Sweden Physicist, Waloddi Weibull, when searching material cracks. Then, the Weibull distribution has been widely applied by the scholars into service life data statistics and reliability research.

In the Weibull distribution, the shape parameter and the scale parameter respectively represent a changing trend of a failure rate and zooming in and zooming out of the coordinate dimension.

Specifically, the process of Weibull PHM modeling is mainly divided into four steps, which are shown as follows[62].

(1) -2LL Inspection

The -2LL inspection is a most commonly used method for inspecting whether a sample satisfies the Weibull distribution.

The Reliability Function for the Weibull distribution is:

$$F(t) = 1 - \exp\left(-\left(\frac{t}{\eta}\right)^{\beta}\right) \quad (5\text{-}9)$$

The Failure Distribution Function is:

$$R(t) = 1 - F(t) = \exp\left(-\left(\frac{t}{\eta}\right)^{\beta}\right) \quad (5\text{-}10)$$

By means of taking the logarithm on two sides of Equation (5-10) twice, it obtains an Equation (5-11), as shown below.

$$\ln(-\ln(R(t))) = \ln\ln\left(\frac{1}{1 - F(t)}\right) = \beta \ln t - \beta \ln \eta \quad (5\text{-}11)$$

As known from Equation (5-11), if the sample conforms to the Weibull distribution, there is a principle that a straight slope for function fitting between ln t and ln(-ln(R(t))) shall be larger than 1, and the straight slope is an estimated value for the shape parameter of the Weibull distribution. Meanwhile, the -2LL inspection is also the most direct way for observing whether a sample data conforms to the Weibull distribution or not.

(2) Constructing a Likelihood Function

The Weibull PHM is:

$$v(t \mid X(t)) = \frac{\beta}{\eta}\left(\frac{t}{\eta}\right)^{\beta-1} \exp(\gamma^T X(t)) \quad (5\text{-}12)$$

The reliability function of the system after the time point t and the failure Probability Density Function of the system at the time point t are respectively shown as follows:

$$R(t \mid X(t)) = \quad (5\text{-}13)$$
$$P\{N(t + \Delta t) - N(t) = 0 \mid X(t)\} = \exp\left\{-\int_{t}^{t+\Delta t} v(u \mid X(u))du\right\}$$

$$f_t(t \mid X(t)) = \frac{\beta}{\eta}\left(\frac{t}{\eta}\right)^{\beta-1} \exp(\gamma^T X(t)) \exp\left\{-\int_{t}^{t+\Delta t} v(u \mid X(u))du\right\} \quad (5\text{-}14)$$

The likelihood function is:

$$L(\beta, \eta, \gamma) = \prod_{i=1}^{n} f(t_i \mid \beta, \eta, \gamma)^{\delta_i} R(t_i \mid \beta, \eta, \gamma)^{1-\delta_i} \quad (5\text{-}15)$$

The likelihood function for the Weibull PHM is:

$$L(\beta, \eta, \gamma) = \left\{\prod_{i \in D} \frac{\beta}{\eta}\left(\frac{t_i}{\eta}\right)^{\beta-1} \exp(\gamma_k X_k(t_i))\right\}\left\{\prod_{j=1}^{n} \exp[-H(t_j)]\right\} \quad (5\text{-}16)$$

in which, $$H(t_j) = \int_{0}^{T_i} \exp(\gamma^T X(t)) d\left(\frac{t_j}{\eta}\right)^{\beta-1} \quad (5\text{-}17)$$

By means of taking the logarithm on two sides of Equation (5-16), a log-likelihood function for the Weibull PHM is obtained, as shown in an Equation (5-18).

$$\ln L(\beta, \eta, \gamma) = \ln\left(\frac{t}{\eta}\right)^d + \sum_{i=1}^{d} \ln\left(\frac{t_i}{\eta}\right)^{\beta-1} + \sum_{i=1}^{d} \ln(\gamma_k X_k(t_i)) - \sum_{i=1}^{n} H(t_j) \quad (5\text{-}18)$$

(3) Solving a Maximum Likelihood Estimation of Each Parameter

The process for solving the maximum likelihood estimation is shown as follows.

It sets a vector formed by unknown parameters as:

$$\theta = [\theta_1, \theta_2, \ldots, \theta_{p+3}] = [\beta, \eta, \gamma_1, \gamma_2, \ldots, \gamma_p] \quad (5\text{-}19)$$

A vector formed by an one-order-partial derivative for each parameter is marked as $G(\theta) = g_i(\theta)$, in which $$g_i(\theta) = \frac{\partial l}{\partial \theta_i}, i = 1, 2, \ldots, p+3 \quad (5\text{-}20)$$

The log-likelihood function is respectively used for solving the one-order-partial derivative of each parameter under estimating, and setting the one-order-partial derivative as being equal to 0. Thus, the following equations are obtained:

$$\frac{\partial l}{\partial \beta} = \frac{d}{\beta} + \sum_{i=1}^{d} \ln\left(\frac{t_i}{\eta}\right) - \ln\left(\frac{t_i}{\eta}\right) \sum_{j=1}^{d} H(t_j) = 0 \quad (5\text{-}21)$$

$$\frac{\partial l}{\partial \eta} = -\frac{d}{\eta} - \frac{(\beta-1)d}{\eta} - \sum_{j=1}^{n} \frac{\partial H(t_j)}{\partial \eta} = -\frac{d\beta}{\eta} - \frac{\beta}{\eta}\sum_{j=1}^{n} H(t_j) = 0 \quad (5\text{-}22)$$

$$\frac{\partial l}{\partial \gamma_k} = x_k(t_i) - x_k(t_j)\sum_{j=1}^{n} H(t_j) = 0, k = 1, 2, \ldots, p+1 \quad (5\text{-}23)$$

By means of forming a simultaneous equation by using Equation (5-21) to Equation (5-23), it can obtain an estimated value of each unknown parameter.

(4) Obtaining a result of the maximum likelihood estimation

The estimated values $\hat{\beta}$, $\hat{\eta}$, $\hat{\gamma}$ for each parameter under estimating is finally solved, and thus the following equation is obtained:

$$h(t \mid X(t)) = \frac{\hat{\beta}}{\hat{\eta}}\left(\frac{t}{\hat{\eta}}\right)^{\hat{\beta}-1} \exp(\hat{\gamma} X(t)) \quad (5\text{-}24)$$

By means of the maximum likelihood estimation, the regression coefficients for the shape parameter, the scale parameter, and the concomitant variable of the Weibull distribution can be calculated, and then a benchmark risk function can be derived. Furthermore, the Reliability Function, the Cumulative Failure Distribution Function, and the failure Probability Density Function of the bogie system and so on can be obtained.

The calculation process for the minimum maintenance cost method is shown as follows:

The average maintenance cost in unit time is:

$$C(t) = \frac{C_r[(C_p/C_r) + E(N(t|X(t)))]}{t} \quad (5\text{-}28)$$

In the above equation, $C_r$ indicates an average cost for replacing and returning for repair after failure, $C_p$ indicates an average cost for preventive maintenance, and $C_p/C_r$ indicates a ratio of the cost for preventive maintenance to the cost for replacing and returning for repair.

E(N(t|X(t))) indicates anticipated failure times in an inspection interval, and the following equation is satisfied:

$$E(N(t|X(t)))=H(t|X(t))=\int_0^t \exp(\gamma \cdot X(t))d(u/\eta)^\beta \quad (5\text{-}29)$$

When the cost is at a minimum level, the failure rate function shall have a smallest slope. Then, a curve H(t)–t is depicted based on Equation (5-29), and then, a tangent line of the function is depicted passing the point (0, $-C_p/C_r$). The point corresponding to the point of tangency indicates an optimized maintenance interval where the cost is at the minimum level.

Determining the control limits for condition-based repair decision making; based on the obtained optimized interval, a failure time being most approximate to the optimized interval and its adjoint variable data are found out from the failure data, and thus, a failure rate threshold h* can be obtained, that is:

$$h^* \geq \frac{\beta}{\eta}\left(\frac{t}{\eta}\right)^{\beta-1} \exp(\gamma \cdot X(t)) \quad (5\text{-}30)$$

By taking the logarithm on two sides of Equation (5-30), the following equation is obtained:

$$\gamma \cdot X(t) \leq \ln\left(\frac{\eta^\beta h^*}{\beta}\right) - (\beta-1)\ln t \quad (5\text{-}31)$$

Then, a draft is made by taking a working time t as an x-coordinate, and taking a value of $$\ln\left(\frac{\eta^\beta h^*}{\beta}\right) - (\beta-1)\ln t$$

as a y-coordinate, which shows control limits corresponding to the maintenance thresholds. Then, corresponding γ·X(t) is calculated based on relevant adjoint variables monitored at a current running time point, and then, a corresponding point is depicted in the drawing. If the point is located below the curve, it indicates that it is located in a district of working well, and the vehicle can continue working. If the point is located above the curve, it indicates that it is located in a district of performance degradation, so that some maintenance measures shall be taken. If the point is located within a shadow district between the upper curve and the lower curve, it indicates that it is located in a critical district, so that this status shall be further monitored and tracked, and the condition-based repairing shall be considered.

Figure 3:
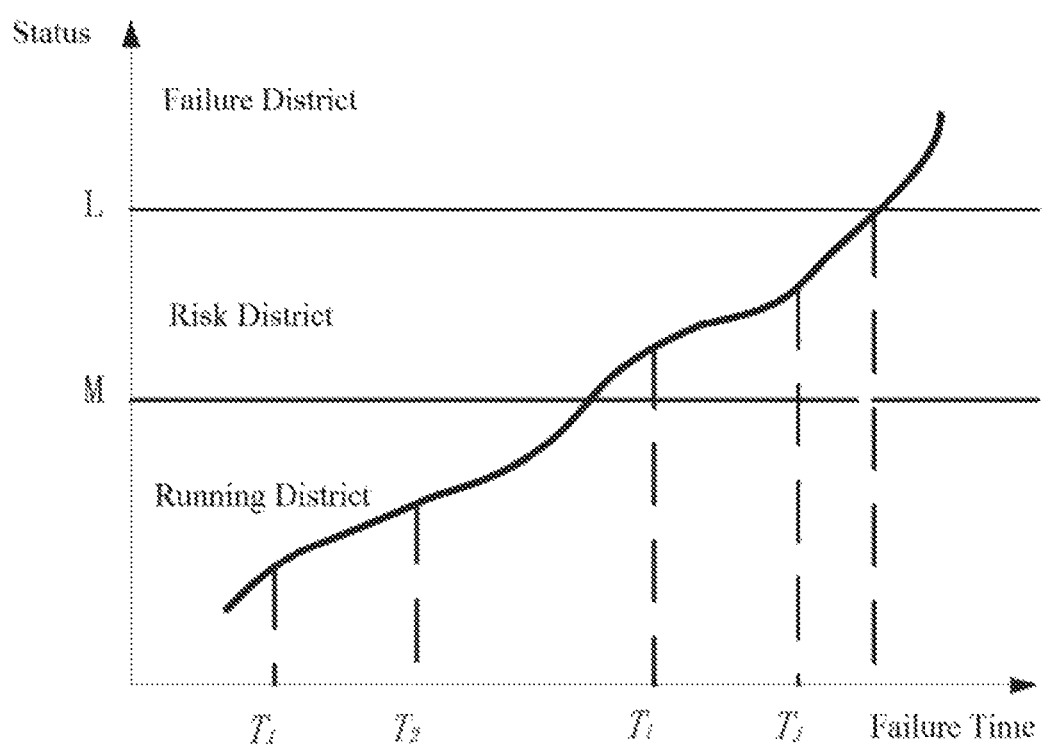
FIG. 3 is a trend changing diagram for a failure process of a repairable system.

In the case of analyzing a repairable system, as the running time is accumulated, the status of the repairable system is gradually deteriorated, as shown in FIG. 3. It is assumed that, an inspection time point is {Ti; i=0,1, . . . , k}, and a difference value between status values at two adjacent inspection time points is marked as $\Delta X_{(k,k+1)}$. During the process of monitoring a complicated system and making the condition-based repair decision, generally, at least an upper control limit and a lower control limit of the status thresholds can be set. An upper control limit L is a failure threshold. During the running process, once it is found that the status value of the system exceeds L, it indicates that the system is in an unusable status at this time, and based on regulations, a corrective maintenance or replacement shall be performed before the system is reused. A low control limit M is a preventive maintenance or replacement threshold, and indicates that a potential failure of the system starts to appear, and once the status value of the system exceeds M, a corresponding troubleshooting or preventive maintenance shall be performed on a corresponding part.

Different types of bogies have different performance indexes, for example, metro bogies use the same type of bogies. In this case, it is assumed that, the failure data for this type of bogies conforms to the same distribution, which is taken as sample data for modeling. Taking 32 pieces of failure data monitored during repairing as shown in Table 5-1 for example, a proportional risk model is adopted for conducting condition-based repair decision-making modeling. The concomitant variables of the model are selected as the failure rate and the safe operation days of each subsystem in the bogie, and an output of the model is a time between failures of the bogie system.

TABLE 5-1

Partial Samples of History Failure Data for Bogie

| Failure Time | GJF | LDF | QDF | THF | ZDF | LJF | GJT | LDT | QDT | THT | ZDT | LJT |
|---|---|---|---|---|---|---|---|---|---|---|---|---|
| 65 | 2 | 1 | 0 | 2 | 0 | 1 | 4 | 4 | 18 | 2 | 19 | 8 |
| 16 | 0 | 2 | 1 | 3 | 0 | 0 | 43 | 6 | 16 | 2 | 18 | 7 |
| ... | ... | ... | ... | ... | ... | ... | ... | ... | ... | ... | ... | ... |
| 22 | 1 | 3 | 0 | 0 | 0 | 0 | 57 | 3 | 53 | 15 | 47 | 22 |

Note:
GJF, LDF, QDF, THF, ZDF, and LJF are respectively the failure rate for the framework, the wheel set and axle box, the driving mechanism, the spring device, the basic brake device, and the connecting device, and GJT, LDT, QDT, THT, ZDT, and LJT are respectively the safe operation days for the framework, the wheel set and axle box, the driving mechanism, the spring device, the basic brake device, and the connecting device when the bogie system is repaired.

(I) Filtering of Concomitant Variables

There are a lot of concomitant variables that can affect the performance of the bogie system. During modeling for the bogie, the time between failures for the bogie is taken as an independent variable. The mainly considered concomitant variables include the failure rate and the safe operation days of the framework, the wheel set and axle box, the driving mechanism, the spring device, the basic brake device, and the connecting device when the bogie system is repaired, and so on. Then, a correlation analysis is performed on these concomitant variables, and then, a most significant concomitant variable is filtered to be included into the created proportional risk model.

(II) Proportional Risk Modeling

Firstly, it is inspected whether a service life period variable conforms to the Weibull distribution or not. Directed to the sample of time between failures, it is calculated by using the above inspection method, and then obtains a calculation result by using Minitab. As known from -2LL inspection method, a logarithmic curve chart between the time between failures t and the failure distribution function F(t) is approximately fitted into a straight line, and the time between failures conforms to the Weibull distribution. As seen from the adjusted A-D inspection quantity and a P value, the A-D statistics is 0.367, and the P Value is higher than 0.250, which indicates that the time between failures conforms to the Weibull distribution rule. Meanwhile, it is obtained that, in the Weibull distribution, the shape parameter $\beta$ is 1.75488, and the scale parameter $\eta$ is 47.76002.

In the proportional risk model for the bogie, the corresponding risk function is:

$$h(t \mid X(t)) = \frac{1.75488}{47.76002}\left(\frac{t}{47.76002}\right)^{0.75488} \exp(\gamma \cdot X(t)) \quad (5\text{-}32)$$

In the above equation, $\gamma$ is a vector formed by each regression coefficient corresponding to the concomitant variable vector, and $\gamma$, similar to $\beta$ and $\eta$, is also a parameter to be estimated.

Based on the proportional risk modeling steps mentioned above, each parameter under estimating is solved by the method of maximum likelihood estimation, according to the failure data samples for the bogie.

Based on the maximum likelihood estimation principle, first of all, the SPSS software is used to compare a correlation coefficient between the concomitant variables, which is shown in the following table. As known from Table 5-2, a higher correlation coefficient indicates that the variables are more closely correlated. Generally, during modeling, the concomitant variables with higher correlation coefficients need to be filtered out, and the concomitant variables with lower correlation coefficients are reserved, so that each variable has a higher independency.

By means of making comparison one by one, the closely correlated concomitant variables are filtered out, and then the concomitant variables actually used for modeling mainly include: the failure rate for the framework, the failure rate for the driving mechanism, the failure rate for the connecting device, and the safe operation days for the driving mechanism, the spring device, and the basic brake device, which are taken as the concomitant variables for being included when the modeling is conducted initially. Then, a concomitant variable filtering method is adopted for filtering the significant concomitant variables. Finally, the most significant concomitant variable that can reflect system failures is determined.

As seen from the result for filtering the significant concomitant variables in the proportional risk model, the failure rate for the wheel set and axle box, the spring device, and the connecting device and the safe operation days for the framework, the wheel set and axle box, the driving mechanism, the spring device, and the connecting device are filtered out because of lacking of significant effects, and finally, the following four concomitant variables, that is, the failure rate for the framework, the failure rate for the driving mechanism, the failure rate for the connecting device, and the safe operation days for the basic brake device are selected as being included into the model, and marked as $X(t)=(x_1(t), x_2(t), x_3(t), x_4(t))$.

Figure 4:
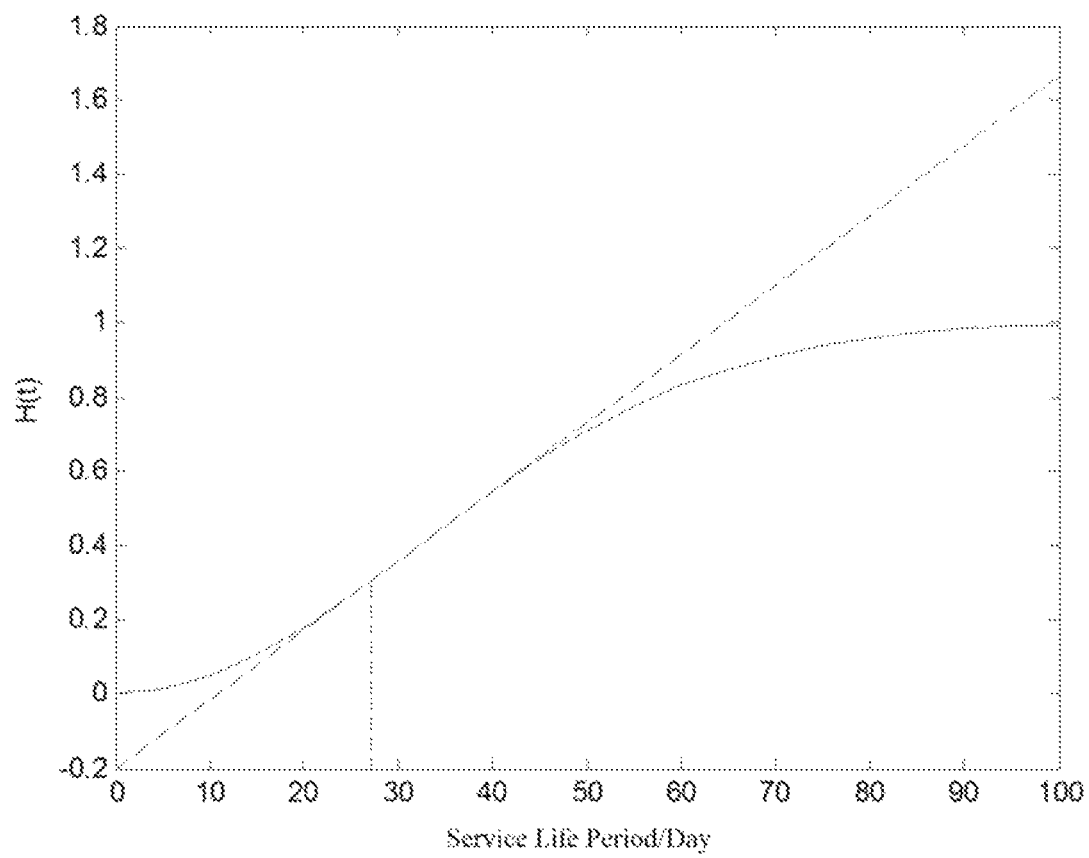
FIG. 4 is a curve diagram of an accumulated risk function.

In the Weibull distribution, the shape parameter $\beta$ is 1.75488, and the scale parameter $\eta$ is 47.76002, so that a corresponding cumulative risk function curve for the system can be obtained as shown in FIG. 4.

$$F(t) = 1 - e^{-\left(\frac{t}{47.76002}\right)^{1.75488}} \quad (5\text{-}33)$$

Since no exact relevant data is searched and collected, it is assumed that the ratio of the cost for preventive maintenance to the maintenance cost of returning for repairing $C_p/C_r$ is 0.2[66], based on a general situation. Then, in FIG. 4, a tangent line to the curve is depicted passing the point (0, −0.2). Then, the failure time corresponding to the location of the point of tangency is obtained as about 27 days, that is, an optimized maintenance interval with the minimum cost.

By means of the maximum likelihood estimation, the shape parameter and the scale parameter of the Weibull distribution are obtained. Then, the regression coefficients are filtered with reference to concomitant variables. Finally, the system risk function is:

TABLE 5-2

Correlation Coefficient between Concomitant Variables

| | GJF | LDF | QDF | THF | ZDF | LJF | GJT | LDT | QDT | THT | ZDT | LJT |
|---|---|---|---|---|---|---|---|---|---|---|---|---|
| GJF | 1 | | | | | | | | | | | |
| LDF | −.318 | 1 | | | | | | | | | | |
| QDF | −.129 | .215 | 1 | | | | | | | | | |
| THF | −.268 | .211 | .187 | 1 | | | | | | | | |
| ZDF | .377 | .045 | .307 | −.150 | 1 | | | | | | | |
| LJF | .481 | −.210 | .246 | −.553 | .134 | 1 | | | | | | |
| GJT | −.114 | .053 | .303 | −.045 | .318 | −.089 | 1 | | | | | |
| LDT | −.298 | .191 | .029 | .136 | −.329 | −.123 | −.356 | 1 | | | | |
| QDT | .109 | −.154 | −.190 | −.227 | −.122 | .158 | −.283 | .089 | 1 | | | |
| THT | .129 | −.191 | −.027 | −.573 | .103 | .511 | −.086 | −.071 | .320 | 1 | | |
| ZDT | −.230 | −.226 | −.123 | −.217 | −.003 | .006 | .161 | −.204 | .147 | −.003 | 1 | |
| LJT | −.293 | .290 | .083 | .041 | −.135 | −.200 | .134 | −.083 | .117 | .024 | .286 | 1 |

$$v(t \mid X(t)) = \tag{5-34}$$
$$\frac{1.75488}{47.76002}\left(\frac{t}{47.76002}\right)^{0.75488} \exp[-2.889x_1(t) - 1.091x_2(t) + 3.483x_3(t) - 0.028x_4(t)]$$

In the above equation, $x_1$, $x_2$, $x_3$, and $x_4$ are respectively corresponding to the failure rate for the framework, the failure rate for the driving mechanism, the failure rate for the connecting device, and the safe operation days for the basic brake device.

Figure 5:
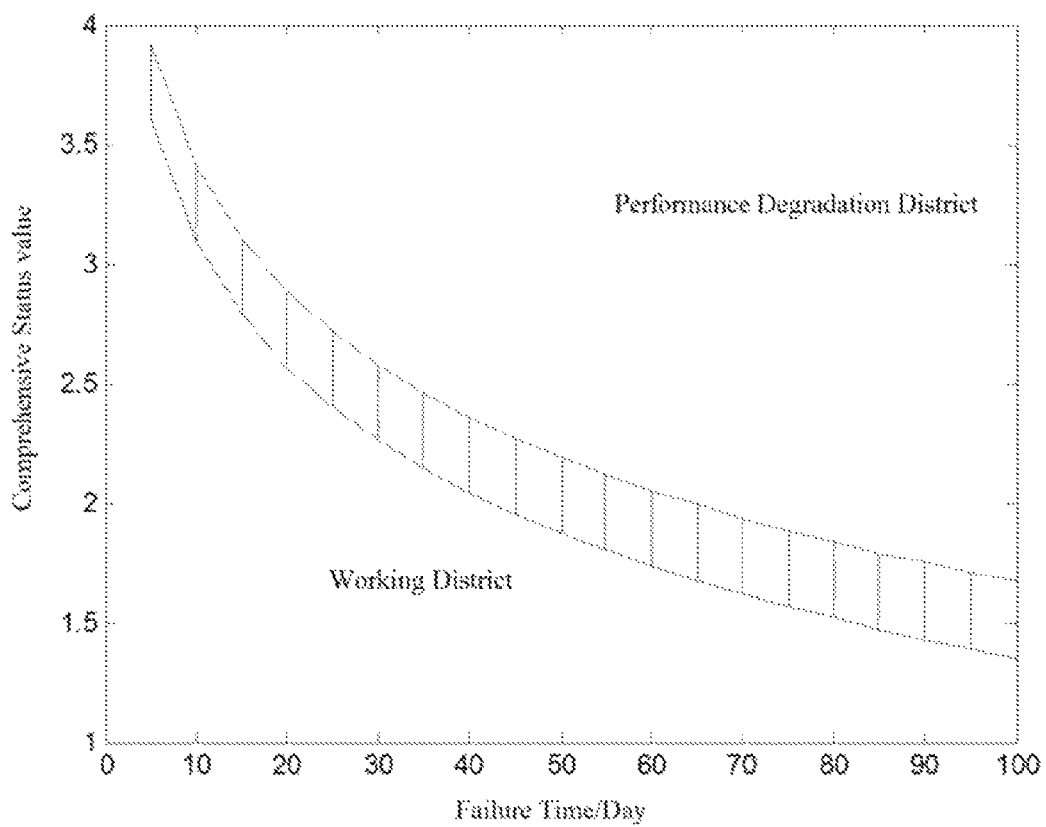
FIG. 5 is a schematic view of control limits for making condition-based repair decisions.

After it is obtained by calculation that the optimized maintenance interval with the minimum cost is 27 days, the failure time being most approximate to 27 days is found from the failure data, that is 24 days and 29 days respectively. Thus, the failure rate and the threshold h* are respectively solved as 0.248 and 0.340. Then, by means of Equation (5-31), an upper control limit and a lower control limit for the condition-based repair decision making are calculated, as shown in FIG. 5. In FIG. 5, the x-coordinate is the failure time, and the y-coordinate is a comprehensive status value. The comprehensive status value can be calculated by using γX(t).

During the actual decision making process, an upper line in FIG. 5 indicates an upper control limit for the condition-based repair. If the comprehensive status value exceeds the upper line, it shall perform the condition-based repairing immediately. A lower line in FIG. 5 indicates a loser control limit for the condition-based repairing. If the comprehensive status value fails between the upper control limit and the lower control limit, the system is in a transition phase and is approaching the failure status, so that the system needs to be further monitored or the preventive maintenance needs to be performed on the system. If the comprehensive status value fails below the lower control limit, generally, it does not need to consider the condition-based repair.

In order to authenticate the validity of the model, the failure rate for the framework, the driving mechanism, and the connecting device, and the safe operation days for the basic brake device, respectively anticipated by using, the subsequent 15 groups of data, are taken as an input, and then, the maintenance suggestions analyzed by using the PHM model are compared with the actual maintenance situations, as shown in Table 5-3.

In the above table, $x_1$, $x_2$, $x_3$, and $x_4$ are respectively the failure rate for the framework, the failure rate for the driving mechanism, the failure rate for the connecting device, and the safe operation days for the basic brake device anticipated by using PSO-BP.

Figure 6:
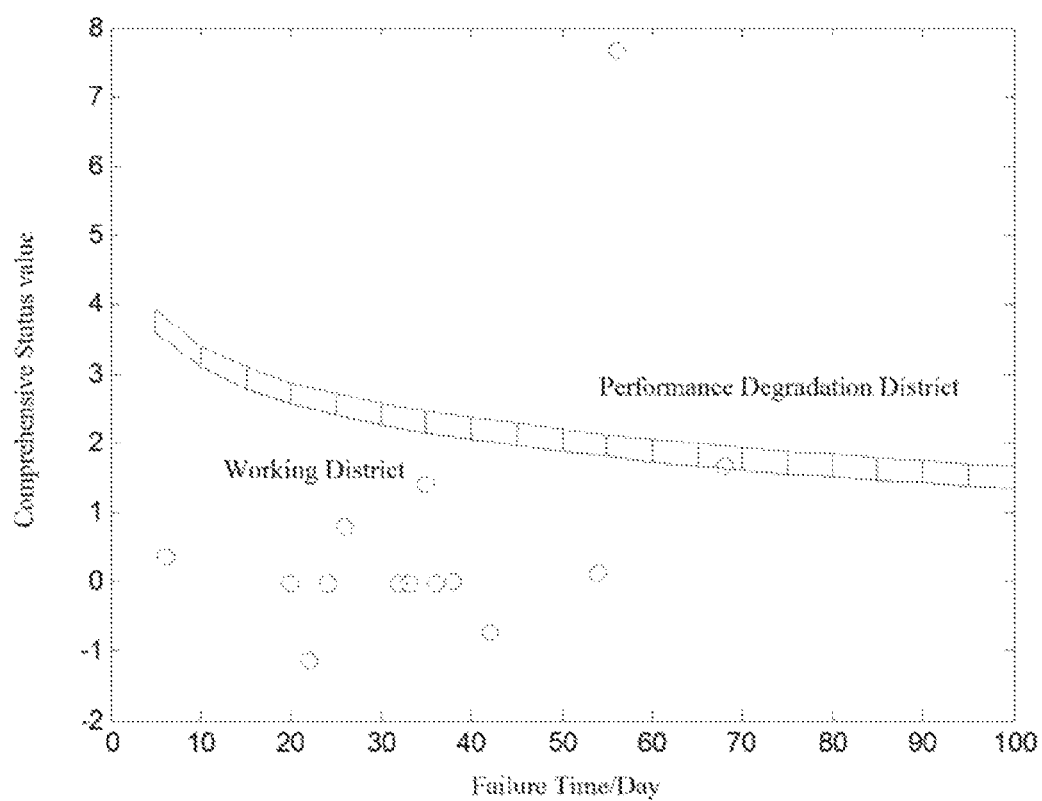
FIG. 6 is a diagram for outputting a repair decision in a PHM model.

As known from FIG. 6, among the 15 groups of data, when the time interval is 56 days, the comprehensive status value is 5.19. As shown in the drawing, it exceeds an upper control limit of the repairing decision making, and thus, it indicates that, the bogie system needs to be repaired in this case. When the time interval is 68 days, the comprehensive status value is 1.96, which falls between the upper control limit and the lower control limit for the repairing decision making, and thus, it indicates that the bogie system needs to be further monitored.

The invention claimed is:

1. A fault prediction and condition-based repair method of an urban rail train bogie, wherein the rail train bogie comprises six subsystems, including a framework, a spring device, a connecting device, a wheel set and axle box, a driving mechanism, and a basic brake device, and the method sequentially comprising as follows:
   Step S1 including performing a censored processing based on a collected history failure data, determining a distribution model of each subsystem of the bogie based on a survival analysis method, obtaining a reliability characteristic function of each subsystem of the rail train bogie, calculating a reliability of each subsystem, and determining a subsystem with a lowest reliability as a most fragile part in the bogie;
   Step S2 including calculating a failure rate of each subsystem of the bogie by adopting a neural network model optimized by an evolutionary algorithm through a digital signal processor (DSP);
   Step S3 including conducting a proportional risk modeling by taking safe operation days and the calculated failure rate of each subsystem of the bogie as concomitant variables, and obtaining thresholds and control limits for the condition-based repair of the bogie, wherein an upper control limit is a failure threshold, and during a running process, once a system status value is found to exceed the upper control limit, the bogie is in an unusable status at this time, a corrective maintenance or replacement of one or more parts shall be performed before the bogie is reused, said parts comprising: a framework, a spring device, a connecting

TABLE 5-3

Comparison between PHM Output and Actual Maintenance Situations

| Time Interval | $x_1$ | $x_2$ | $x_3$ | $x_4$ | γ · X(t) | PHM Suggestions | Actual Situations |
|---|---|---|---|---|---|---|---|
| 32 | 4.5E−10 | −3.3E−10 | 1.51E−10 | 19 | 0.532 | Work Well | No Repair |
| 36 | 3.3E−1.0 | −5E−11 | 1.1E−10 | 18 | 0.504 | Work Well | No Repair |
| 26 | −4E−10 | 2.251902 | 0.934512 | 6 | 0.966081 | Work Well | No Repair |
| 33 | −5.5E−10 | 3.13E−10 | 5.53E−11 | 7 | 0.196 | Work Well | No Repair |
| 22 | 1.66E−10 | 1.038347 | −1.1E−10 | 12 | −0.79684 | Work Well | No Repair |
| 54 | 4.98E−10 | 3.201479 | 1.039995 | 20 | 0.689488 | Work Well | No Repair |
| 56 | −3.4E−10 | 5.57E−13 | 1.200986 | 36 | 5.191034 | Repair | No Repair |
| 38 | −1E−09 | −4.5E−10 | −1.8E−10 | 40 | 1.12 | Work Well | No Repair |
| 42 | 0.25 | 1.25E−10 | −1.3E−10 | 18 | −0.21825 | Work Well | No Repair |
| 35 | 0.971 | −1.4E−10 | 6.02E−10 | 18 | 1.251696 | Work Well | No Repair |
| 68 | 1.79E−10 | 2.08237 | 1.336667 | 22 | 1.954844 | Monitoring | No Repair |
| 6 | 3.03E−10 | −1.6E−10 | 0.107797 | 26 | 1.103455 | Work Well | No Repair |
| 22 | 3.44E−10 | 1.008417 | 2.21E−10 | 28 | −0.31618 | Work Well | No Repair |
| 20 | 1.13E−10 | −1.1E−10 | −7.3E−10 | 66 | 1.848 | Work Well | No Repair |
| 24 | −2.9E−10 | −3.4E−11 | −5.4E−10 | 70 | 1.96 | Work Well | No Repair | device, a wheel set and axle box, a driving mechanism, or a basic break device; a lower control limit is a preventive maintenance or replacement threshold, and indicates that a potential failure of the bogie starts to appear, and once a system status value exceeds the lower control limit, a corresponding troubleshooting or preventive maintenance shall be performed on a corresponding part, and if the system status value is lower than the lower control limit, the system does not need to be repaired;

wherein Step S1 further comprises steps as follows:

S11 including creating a two-parameter Weibull distribution model of the wheel set and axle box, the spring device, and the connecting device, wherein a Failure Distribution Function is:

$$F(t) = 1 - \exp\left\{-\left[\frac{t}{\eta}\right]^\beta\right\}$$

a Reliability Function is:

$$R(t) = \exp\left\{-\left(\frac{t}{\eta}\right)^\beta\right\}$$

a Probability Density Function is:

$$f(t) = \frac{\beta}{\eta}\left(\frac{t}{\eta}\right)^{\beta-1} \exp\left[-\left(\frac{t}{\eta}\right)^\beta\right]$$

a Failure Rate Function is:

$$\lambda(t) = \frac{\beta}{\eta}\left(\frac{t}{\eta}\right)^{\beta-1}$$

wherein, t≥0, β>0, and η>0, t is a time between failures, β and η are respectively a shape parameter and a scale parameter of the distribution;

S12 including creating a three-parameter Weibull distribution model of the framework, the driving mechanism, and the basic brake device, wherein the Failure Distribution Function is:

$$F(t) = 1 - \exp\left\{-\left[\frac{t-\gamma}{\eta}\right]^\beta\right\}$$

the Reliability Function is:

$$R(t) = \exp\left\{-\left(\frac{t-\gamma}{\eta}\right)^\beta\right\}$$

the Probability Density Function is:

$$f(t) = \frac{\beta}{\eta}\left(\frac{t-\gamma}{\eta}\right)^{\beta-1} \exp\left[-\left(\frac{t-\gamma}{\eta}\right)^\beta\right]$$

the Failure Rate Function is:

$$\lambda(t) = \frac{\beta}{\eta}\left(\frac{t-\gamma}{\eta}\right)^{\beta-1}$$

wherein t is a time between failures, β>0 and η>0, β and η are respectively a shape parameter and a scale parameter of the distribution, γ is a location parameter of the distribution;

wherein Step S2 further comprises steps as follows: creating a back propagation (BP) neural network model based on Particle Swarm Optimization (PSO), optimizing a BP neural network connecting weight by adopting PSO, training the BP neural network, and during modeling, determining PSO parameters, and setting the parameters as follows:

S21 selecting a particle number as 30;

S22 selecting a maximum particle velocity as 0.5;

S23 updating a speed and a location of a particle provided by an acceleration sensor based on equations as follows:

$$v_i^{k+1} = w^* v_i^k + c_1 r_1 (p_i^k - x_i^k) + c_2 r_2 (p_g^k - x_i^k)$$

$$x_i^{k+1} = x_i^k + v_i^{k+1}$$

wherein, in the above equations, $v_i^{k+1}$ indicates a flying velocity of a $i^{th}$ particle at a $(k+1)^{th}$ generation; $x_i^{k+1}$ indicates a location of the $i^{th}$ particle at the $(k+1)^{th}$ generation; $p_i^k$ indicates an optimum location of the $i^{th}$ particle to the $k^{th}$ generation; $p_g^k$ indicates an optimum location of a swarm to the $k^{th}$ generation; $p_i^k - x_i^k$ indicates an individual cognition; $p_g^k - x_i^k$ indicates a swarm cognition; w indicates an inertia weight; $v_i^k$ indicates a velocity of a particle; $c_1$ and $c_2$ indicate learning factors; $r_1$ and $r_2$ are random numbers evenly distributed in [0,1]; i=1, 2 ... N;

S24 using a fitness function as follows, $f=1/RMSE$;

S25 initializing; normalizing input and output data to [−1,1], wherein particle swarms generated after initializing represent a neural network combined by different weights and thresholds, and generate an initial BP network structure;

S26 evaluating; calculating a fitness value based on the equation in S24;

S27 updating a location and a velocity; continuously updating locations of particles by means of comparing the fitness values, taking an individual extremum with the best fitness value as a global extremum, taking the corresponding weight and threshold as a current optimum solution of the particle swarm, and updating the velocity;

S28 determining termination of the algorithm; terminating iteration when it reaches maximum iteration times or the fitness value reaches an expected error;

S29 survival of the optimum solution; when the iteration is terminated, a weight and a threshold corresponding to a global weight is an optimum solution for a training sample; and S30 performing learning by substituting the optimum solution into the BP neural network model, for anticipating a failure rate;

wherein Step S3 further comprises steps as follows:

S31 creating a proportional risk model of the bogie, wherein a risk function is:

$$h(t\mid X(t)) = \frac{\beta}{\eta}\left(\frac{t}{\eta}\right)^{\beta-1}\exp(\gamma\cdot X(t))$$

obtaining a failure rate threshold $h^*$:

$$h^* \geq \frac{\beta}{\eta}\left(\frac{t}{\eta}\right)^{\beta-1}\exp(\gamma\cdot X(t))$$

wherein, t is a time between failures, $\beta>0$, and $\eta>0$, $\beta$ and $\eta$ are respectively a shape parameter and a scale parameter of the distribution, $\gamma$ is a location parameter of the distribution, and X(t) is a concomitant variable; and S32 making a draft by taking a working time t as an x-coordinate, and taking a value of $$\ln\left(\frac{\eta^{\beta}h^*}{\beta}\right) - (\beta-1)\ln t$$

as a y-coordinate, wherein an upper line in the drawing indicates the upper control limit corresponding to the failure rate threshold, and a lower line indicates the lower control limit corresponding to the failure rate threshold.

2. The fault prediction and condition-based repair method of the urban rail train bogie of claim 1, wherein reliability characteristics values for the wheel set and axle box conform to the two-parameter Weibull distribution model, wherein the shape parameter $\beta$ is 1.30274, the scale parameter $\eta$ is 6.65490, the threshold $\gamma$ is 30.8751; the Failure Time Probability Density Function $f(t)$, the Cumulative Distribution Function F(t), the Reliability Function R(t), and the Failure Rate Function $\lambda(t)$ are provided as follows:

the Failure Time Probability Density Function is:

$$f(t) = \frac{1.30274}{6.65490^{1.30274}}(t-30.8751)^{0.30274}e^{-\left(\frac{t-30.8751}{6.65490}\right)^{1.30274}}$$

the Cumulative Distribution Function is:

$$F(t) = 1 - e^{-\left(\frac{t-30.8751}{6.65490}\right)^{1.30274}}$$

the Reliability Function is:

$$R(t) = e^{-\left(\frac{t-30.8751}{6.65490}\right)^{1.30274}}$$

the Failure Rate Function is:

$$\lambda(t) = \frac{1.30274}{6.65490}\left(\frac{t-30.8751}{6.65490}\right)^{0.30274}$$

wherein t indicates a current time between failures.

* * * * *